Nov. 11, 1952        R. E. DERBY        2,617,197
MACHINE FOR MEASURING LEATHER

Filed Aug. 5, 1947        2 SHEETS—SHEET 1

Inventor
Ralph E. DERBY
by Roberts, Cushman & Grover
Att'ys

Nov. 11, 1952 R. E. DERBY 2,617,197
MACHINE FOR MEASURING LEATHER
Filed Aug. 5, 1947 2 SHEETS—SHEET 2
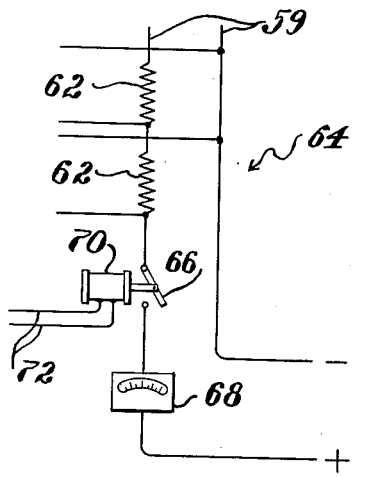
Fig. 5
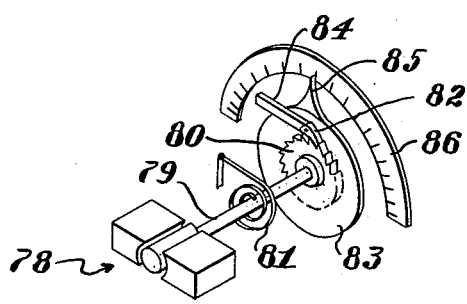
Fig. 6
Fig. 7
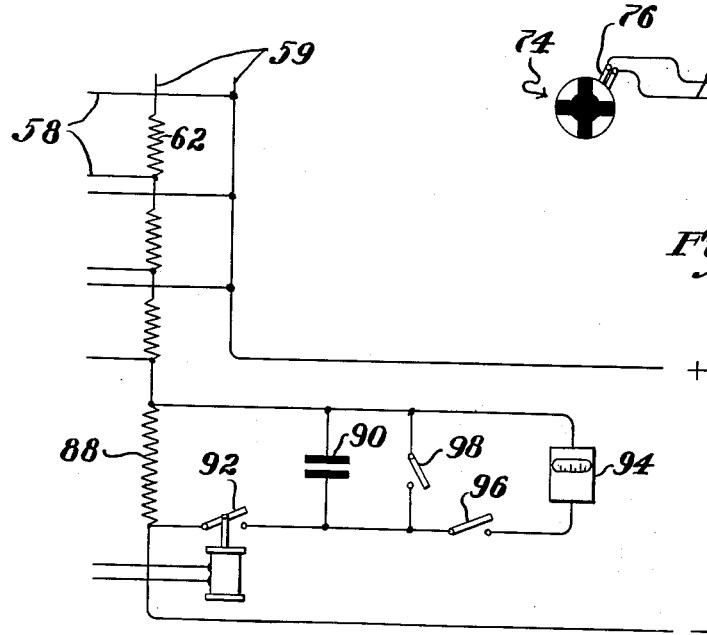
Fig. 8
Inventor
Ralph E. Derby
by Roberts, Cushman & Grover
Atty's Patented Nov. 11, 1952

2,617,197

UNITED STATES PATENT OFFICE 2,617,197

MACHINE FOR MEASURING LEATHER

Ralph E. Derby, Salem, Mass.

Application August 5, 1947, Serial No. 766,170

3 Claims. (Cl. 33—123)

This invention relates to measuring machines and more particularly an improved machine for measuring the area of sheet material such as hides and skins.

The conventional area-measuring machine includes a pair of feed rolls, with one or both of which are associated detector elements arranged to engage the surface of a hide fed between the rolls to actuate mechanical or electrical means to cause a meter to register in square feet the area of the hide passing through the rolls. Such machines are not suitable for measuring the area of wet hides and skins such as have recently been removed from tanning or batting vats because they are bulky, flabby and slippery and do not feed well when presented to the feed rolls, often slipping so that accurate measurements are impossible. Moreover, the feed rolls act as wringers and express so much of the tanning and batting liquor at the bite of the rolls that the detector elements associated therewith become fouled up and inaccurately operative.

Objects of the present invention are to provide a machine which is free of the foregoing disadvantages, that is, it will feed a hide which is wet, soft and flabby without slippage and hence afford accurate measurements thereof, which will not express the treating liquors from the hide, which is simple in construction, having a minimum of mechanical and electrical elements, which can measure wet or dry skins, which is not affected appreciably by variations in the thickness of the material, and which is durable.

With the foregoing objects in view, the present machine includes a plurality of uniformly spaced hide-contacting detector elements supported at a given position for contact with a hide, the latter being moved at a uniform speed below the detector elements by a horizontally arranged supporting member adapted to receive the hide in a substantially flat condition and bodily to move it linearly. A plurality of open circuits corresponding in number to the detector elements are connected to an integrating means including an indicator which is calibrated in square feet for a given linear speed of the supporting member. The circuits are closed by passage of the hide below the detector elements and are additive in direct proportion to the number of them closed to cause the indicator to indicate the square feet of hide which have passed beneath the elements. The supporting means is illustrated as an endless belt, preferably of rubber, to which the wet hides will adhere and travel without other feeding means, and is supported at its opposite ends on spaced drums journaled on a base frame, one of the drums being driven at a uniform speed by suitable motive power, such as a synchronous electric motor. The upper run of the belt is substantially horizontal hence there is no tendency for a hide resting thereon to slip off, and mounted above and transversely thereof are the aforesaid detector elements. Each element is pivotally supported for limited movement between the belt and a corresponding switch contact fixed to a secondary frame fastened to the base frame and spaced above the belt. Hence movement of the hide beneath the elements will raise them causing them to close the switches.

The switches are connected to suitable integrating means including an indicator calibrated in square feet so that direct readings of the number of square feet of hide passing beneath the detector elements may be had at any time.

The invention will now be described with reference to the accompanying drawings, in which:

Fig. 5 is a diagrammatic view of an alternative form of integrating device;

Fig. 6 is a perspective view of a detail thereof;

Fig. 7 is a vibrator circuit for the integrator shown in Figs. 5 and 6; and

Fig. 8 is a diagrammatic view of a third form of integrating device.

Figure 1:
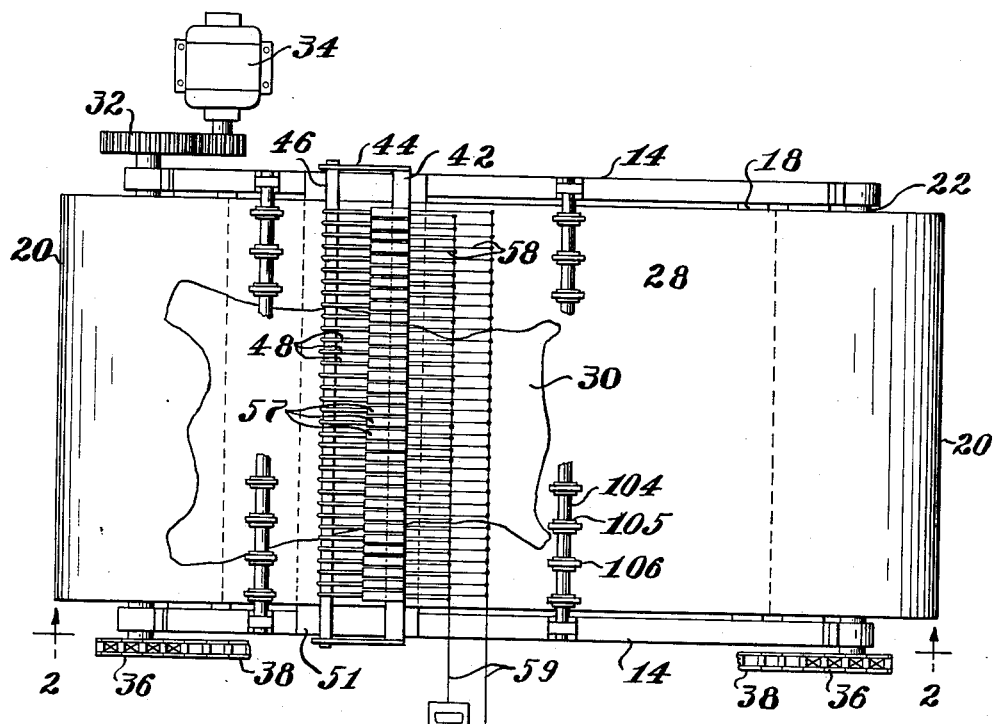
Fig. 1 is a plan view of the machine which forms the subject-matter of the present invention, showing a hide resting on a supporting surface beneath measuring instrumentalities.

Referring to the figures, the machine comprises a substantially rectangular frame 10 consisting of four posts or legs 12 tied together both longitudinally and transversely at their top and bottom ends by stringers 14, 16 and 18. Mounted at opposite ends of the frame are cylindrical drums 20 which extend transversely of the frame and are fixed to shafts 22, the latter being journaled at their opposite ends in brackets 24 fastened to the ends of the frame near the top thereof. An endless belt 26 of substantially the same width as the drums is mounted thereon for rotation with its upper run 28 in a substantially horizontal position spaced above the top of the frame, this run providing a support for sheet material 30 such as a hide or skin, the area of which is to be measured and for moving it relative to measuring devices which will be described hereinafter. Preferably the belt is made of sheet rubber, although it is to be understood that it could be made of reinforced fabric such as canvas impregnated with a waterproof material or preservative and having a substantially smooth surface.

The belt is driven in such a manner that the surface speed of the upper run 28 is uniform by driving one of the drums 20 at a uniform rotational speed. This is accomplished, as shown in Fig. 1, by attaching to one end of one of the shafts 22 a gear 32 and connecting this by one or more reduction gears to a synchronous electric motor 34. Preferably the upper surface should have a speed of about 50 feet per minute although it is to be understood that this speed is not critical as other speeds may be employed. The important feature is that the speed should be constant. It is to be understood, however, that other motivating means may be employed together with suitable means for synchronizing the connection between the motivating means and the shaft to produce uniform rotation thereof. As illustrated herein, the opposite end of the driven shaft 22 has thereon a sprocket 36 and the shaft 22 at the opposite end of the frame is likewise provided with a sprocket 36. A chain 38 mounted on the sprockets imparts the motion of the driven shaft 22 to the opposite shaft. This driving connection between the shafts may, however, be omitted since the belt itself will transmit the motion of the drum 20 on the driven shaft to the drum at the opposite end of the machine.

Figures 3, 4:
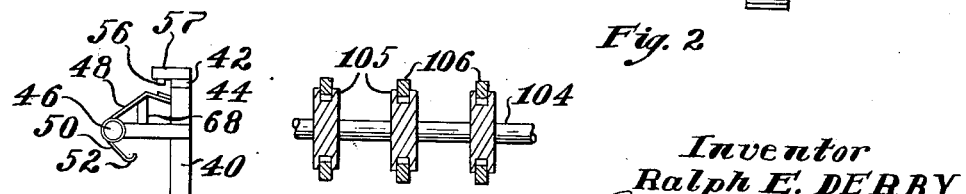
Fig. 3 is a detail of a detector element showing an open switch.
Fig. 4 is a detail view transversely of the machine showing the hold-down rolls in section.

Mounted at opposite sides and on the top stringers 14 of the frame 10 in an upright position is a pair of posts 40 connected between their upper ends transversely of the machine by a bar 42. Extending forwardly from each post, that is toward the front end of the machine, is an arm 44 and between them there is mounted a transverse rod 46. Pivotally mounted on the rod 46 are a plurality of uniformly spaced detector elements. These elements are made of light resilient material such as round spring wire and have diverging arms 48 and 50, the latter having bent up terminal ends 52 adapted to provide smooth frictionless bearing surfaces which will ride up on to the surface of the hide or skin without catching at its edges. The upper arm 48 of each detector element has at its terminal end a substantially horizontal portion 54 which is arranged by contact with a switch element 56 of a switch 57 such as a micro-switch or mercury-switch, fixed to the top side of the bar 42 to close the same when it is urged upwardly by the passage of the hide beneath the bent end 52 of the detector elements 50. The open position of the detector elements, that is the position they will occupy when no material is located below the end 52, is determined and limited by stops 68, Fig. 3, corresponding in number to the detectors fixed to a bar extending between the arm 44. The switch elements 56 correspond in number and disposition to the detector elements and form closing means for a corresponding number of open circuits indicated at 58. To hold the upper run of the belt perfectly flat as it passes beneath the detector elements, a flat metal or wood plate or table 51 is fastened to the frame beneath the belt being supported by legs 55.

In the preferred form of the invention each switch circuit is connected in parallel by way of conductors 59 to an integrating device 60 in the form of a watt-hour meter, the latter being calibrated to read in square feet for a given linear speed of the endless belt. Since the watt-hour meter will register the amount of power passing therethrough by maintaining the voltage constant, the reading will be directly proportional to the total number of switches closed at any given time, and hence the cumulative reading will represent the area of the hide measured. The meter may be reset after each hide has passed through or may be cumulative in that it will give the total area of a plurality of hides passed through.

Alternatively, the switch circuits may be connected to integrating means 64 as illustrated in Figs. 5 and 6. As shown therein, the switch circuits are connected to the aforesaid conductors 59 with resistances 62 interposed between them and in one of the conductors 59 there is interposed a vibrator switch 66 and an indicator 68. The vibrator switch 66 is actuated by the plunger of a solenoid 70, the latter being actuated, as illustrated in Fig. 7, by intermittently making and breaking the current in the solenoid circuit 72. This is accomplished by means of a conventional commutator 74 and brushes 76, the former being conveniently fixed to a portion of the driven shaft 22. The indicator 68 comprises the usual rotor and stator elements indicated at 78, Fig. 6, the former of which will respond to current passing through the latter to impart rotational movement to a spindle 79. Attached to the spindle 79 is a ratchet wheel 80. A spring 81 tends to return the shaft towards its original position upon cessation of the current or reduction thereof. A disc 83 having a pointer 85 affixed thereto is associated with the ratchet wheel and has a pawl 82 fixed thereto. A scale 86 is provided along which the pointer may move. As thus constructed, when the switch 66 momentarily closes, a current, which is proportional to the number of main switches 67 closed at that time by contact of the detector elements with a width of skin having a unit length, will pass through the meter 68 rotating the ratchet wheel and hence the pointer a given amount. As soon as the switch 66 opens, the ratchet wheel will return to its original position and then will be again rotated to the right by subsequent closing of the switch 66. Each current impulse will vary with the width of the skin and hence the distance the pointer 84 will move along the scale will vary according to the width of the skin. Since these currents are additive by way of the aforesaid ratchet means, by properly calibrating the scale, to read in square feet, it will therefore measure the area of the hide passing beneath the detector elements. With this particular integrating device the meter may be reset after each skin has passed through by withdrawing the pawl 80, a link 84 being provided for this purpose.

In still another form the integrating means may comprise, as shown in Fig. 8, a potentiometer circuit interposed in one of the conductors 59 including a resistance 88, a condenser 90, and a vibrator switch 92. The vibrator switch 92 is operated in the same manner as the vibrator switch 66 in the integrating device described above and hence will not be repeated. In operation, each time the vibrator switch 92 is closed, as described above, current is allowed to flow in the potentiometer circuit, the amount of which will be determined by the number of switches 57 which are closed at any given time by the detector elements. Each current flow will be stored up in the condenser 90 and will correspond to the area of an increment of skin of a given width and unit length passing below the detector elements. Shunted across the condenser is an indicator 94, for example a voltmeter, and in the shunt circuit is a switch 96 by which the shunt circuit may be closed to pass the accumulated current through the voltmeter. By properly calibrating the voltmeter as heretofore indicated to read in square feet, the amount of current charged into the condenser during the passage of a hide beneath the detector elements will, when passed through the voltmeter, give a direct reading in square feet of the area of the hide. To reset the meter for the next hide an unloading switch 98 is shunted across the condenser and this may be employed to short-circuit the condenser. The operation of the switch 98 may be manual; however, if desired, it may be connected by suitable kinematic means to the detector elements in such a manner that when all of the detector elements rest against their stops the meter 94 will automatically be reset so that the device will reset itself for each skin as it passes through the machine. If the resetting device is not employed or if it is present and is not in operation, the machine will register the cumulative square feet of hide passing through the machine until it is either automatically or manually reset.

As heretofore explained, the endless belt is preferably composed of rubber and its upper supporting surface 28 is in a substantially horizontal plane. This is particularly important in handling hides and skins which have been recently removed from tanning and batting vats and hence are wet, flabby and slippery. Such skins are difficult to handle, being especially difficult to feed between pairs of wringer-like feed rolls as have been used heretofore in measuring machines. In the present machine, the wet hides actually adhere to the rubber surface of the endless belt, the wet surfaces acting in a manner to produce cohesion between the same so that the hides are fed uniformly without slippage. This is probably due to some such physical phenomenon as molecular cohesion in the film of liquid between the wet hide and the smooth surface of the belt. Since the upper run of the belt is horizontal, there is no tendency for the hides to slip sidewise. While the use of the rubber belt is particularly suitable for handling wet skins, it is also within the scope of the invention to measure dry skins thereon.

Figure 2:
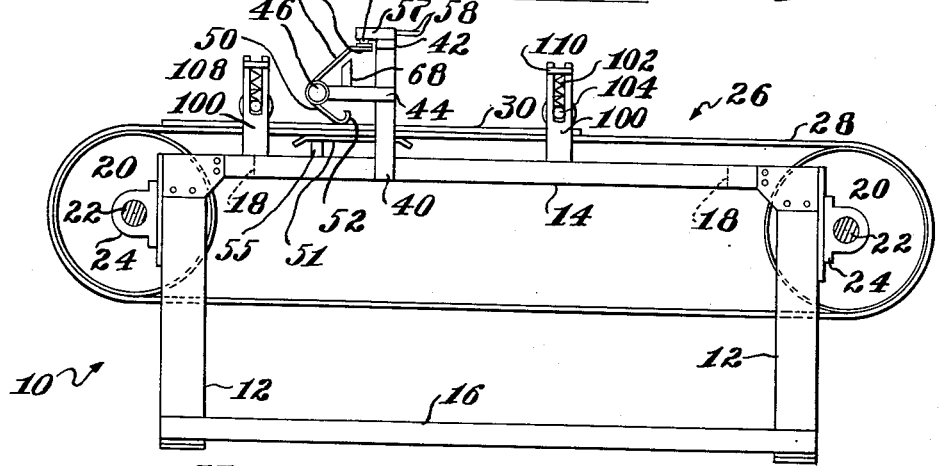
Fig. 2 is an elevational view taken longitudinally of the machine on the line 2—2 of Fig. 1.

There is some tendency for certain portions of the hides to be somewhat wavy, that is, not perfectly flat, particularly near the edges, because of irregularities and uneven stretch in the hide, and hence hold-down rolls may be employed at one or both sides of the measuring means to apply a light pressure to the top side of the hides. As illustrated, Figs. 1 and 2, this is accomplished herein by the provision of pairs of spaced posts 100 located at the forward and rear sides of the measuring means, these posts being fixed in upright position to the stringers 14 at opposite sides of the frame and having in their upper ends open slots 102. Journaled in these slots are transversely extending rods 104 on which are mounted a plurality of spaced discs 105, Fig. 4, the peripheral surfaces of which are grooved loosely to receive rings 106, the latter being adapted to roll on the skins or hides as they move along with the belt. The rods 104 are free to come and go in the slots 102 and, if desired, the flattening effect of these rings 106 may be accomplished entirely by their weight. Yieldable means in the form of springs 108, however, may be set into the slots 102 against the rods 104 and confined therein by caps 110 fixed to the top of the posts over the open ends of the slots 102. In any case, the springs should be light enough so that there is no squeezing effect exerted on the hides by the rings 106 since it is not desirable to squeeze or wring the tanning or batting liquor from the hides during this measuring process.

In operation the wet hides or dry hides are placed upon the endless belt and because of its flat surface and the aforesaid tendency for the wet hides to adhere to the surface of the belt, they immediately pick up the speed of the belt and are carried forwardly at a uniform speed beneath the bent portions 52 of the detector elements. The hides being of a very irregular shape when passing beneath these detector elements will cause certain of them to pivot about the rod 46 and hence close corresponding numbers of the switches 56, while others will remain resting against the stops 68 so that these circuits will not be closed. As the hide continues advancing, additional ones of the switches are closed while others may be opened. The cumulative effect of the closed and open circuits registers on the indicator of the integrating means in whatever form it takes in direct proportion to the number closed to give a reading in square feet of the area of hide which has passed under the detector elements at any given time.

It should be understood that the present disclosure is for the purpose of illustration only and that this invention includes all modifications and equivalents which fall within the scope of the appended claims.

I claim:

1. In a machine for measuring the overall area of wet leather stock and wherein the stock is advanced at an accurately predetermined speed, while outspread horizontally, along a horizontal path through a distance exceeding the length of the piece of stock, in combination, a row of detectors extending transversely across and above said path intermediate its ends, each detector comprising a length of thin wire bent to form two arms, one of which contacts the upper surface of the stock as the latter moves along said path, the other arm being engageable with a circuit closer, a fixed flat platform extending transversely and below said path at the place where said arms contact the upper surface of the stock, said platform unyieldingly supporting an appreciable length of the stock as it moves along said path beneath said arms, integrating means including an indicator, normally open circuits connected to said indicator, and circuit closers for closing the respective circuits, said circuit closers being actuated by the movement of the respective detector elements occasioned by the passage of the stock beneath them.

2. A machine according to claim 1 wherein the detectors are pivotally mounted on a rod extending transversely of the path of movement and parallel thereto and limit stops are situated below the upwardly directed arms of said detectors to prevent contact of the stock engaging arms with the stock advancing means in the absence of stock.

3. A machine according to claim 1 wherein holddown means extend transversely of the path of movement of the stock in contact with the upper surface of the stock thereby to maintain it substantially flat and taut as it moves across the platform beneath the detectors.

RALPH E. DERBY.

REFERENCES CITED

The following references are of record in the file of this patent:

UNITED STATES PATENTS

| Number | Name | Date |
|---|---|---|
| 469,680 | Clark | Mar. 1, 1892 |
| 730,491 | Thomson | June 9, 1903 |
| 797,680 | Glenn | Aug. 22, 1905 |
| 1,219,345 | Newell | Mar. 13, 1917 |
| 1,259,687 | Waterloo | Mar. 19, 1918 |
| 1,619,143 | McFall | Mar. 1, 1927 |
| 1,865,310 | Finney | June 28, 1932 |
| 1,993,109 | Merritt | Mar. 5, 1935 |
| 2,316,015 | Owens et al. | Apr. 6, 1943 |
| 2,354,767 | Nokes | Aug. 1, 1944 |

FOREIGN PATENTS

| Number | Country | Date |
|---|---|---|
| 279,546 | Great Britain | Oct. 27, 1927 |
| 329,753 | Italy | Sept. 20, 1935 |
| 429,490 | Germany | May 28, 1926 |